(12) United States Patent
Rusev et al.

(10) Patent No.: US 12,086,612 B2
(45) Date of Patent: *Sep. 10, 2024

(54) MULTITENANCY HIERARCHICAL UPDATE CAMPAIGNS

(71) Applicant: VMware LLC, Palo Alto, CA (US)

(72) Inventors: Sabo Rusev, Sofia (BG); Ivo Petkov, Sofia (BG); Militsa Borisova, Sofia (BG); Ilya Mayorski, Sofia (BG); Dobromir Ivanov, Sofia (BG)

(73) Assignee: Omnissa, LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/210,850

(22) Filed: Jun. 16, 2023

(65) Prior Publication Data

US 2023/0333862 A1 Oct. 19, 2023

Related U.S. Application Data

(63) Continuation of application No. 16/702,768, filed on Dec. 4, 2019, now Pat. No. 11,720,372.

(51) Int. Cl.
| | |
|---|---|
| *G06F 9/46* | (2006.01) |
| *G06F 8/65* | (2018.01) |
| *G06F 9/445* | (2018.01) |
| *H04L 67/10* | (2022.01) |

(52) U.S. Cl.
CPC ............ *G06F 9/44505* (2013.01); *G06F 8/65* (2013.01); *H04L 67/10* (2013.01)

(58) Field of Classification Search
None
See application file for complete search history.

(56) References Cited

U.S. PATENT DOCUMENTS

| | | |
|---|---|---|
| 7,853,609 B2 | 12/2010 | Dehghan |
| 8,615,581 B2 | 12/2013 | Dare |

FOREIGN PATENT DOCUMENTS

| | | |
|---|---|---|
| WO | 2021104633 A1 | 6/2021 |

*Primary Examiner* — Bing Zhao
(74) *Attorney, Agent, or Firm* — Kim & Stewart LLP

(57) ABSTRACT

Disclosed are various embodiments for separating creation of and executing of updated campaigns in multitenancy environments. For example, an organization can have a hierarchical structure such that a root organization includes multiple sub-organizations. A root organization administrator may create an update campaign for enforcing software policies on devices that are included in the sub-organizations. A sub-organization administrator can approve and define the execution schedule for when the devices included in the sub-organization can execute the update campaign.

17 Claims, 5 Drawing Sheets

MULTITENANCY HIERARCHICAL UPDATE CAMPAIGNS

CROSS-REFERENCE TO RELATED APPLICATIONS

This application is a continuation of and claims benefit to U.S. patent application Ser. No. 16/702,768 filed on Dec. 4, 2019, the entire contents of which is hereby incorporated herein by reference.

BACKGROUND

Appliances, vehicles, sensors, controllers, actuators, and other devices can gather data and interact with the physical world. This network of devices or Internet-of-Things (IoT) can be utilized to improve operations and provide new services. Different types of IoT devices have different capabilities that can be useful in interacting with the physical world. For example, appliances have network connectivity and computing components, allowing household appliances such as a refrigerator to reorder food from the grocery store for delivery or for a washing machine or a dryer to send an alert to a smartphone indicating that the appliance is finished. Automobiles have network connectivity, allowing individual components of the automobile to connect to the Internet, such as, allowing the radio to stream music from the Internet. Even thermostats and sprinkler controllers have network connectivity, allowing adjustment of settings based on weather reports downloaded from the Internet or remote adjustment of settings using a smartphone or computing device. In order to access a network, IoT devices can connect through a gateway or another edge device.

In order to ensure the security and reliability of IoT device connections in an enterprise setting, the enterprise can utilize a management service capable of managing the network of IoT devices. However, the scale of the Internet of Things presents a number of management issues. For example, where an enterprise can have had a few hundred computers that could be manually updated by an information technology (IT) department, the number of devices in the Internet of Things can result in tens of thousands of network connected devices being deployed in an enterprise environment. Management of these devices, such as requirements to deploy software updates, at such scale strains the resources of not just IT departments, but also of many automated solutions employed by enterprises for managing network connected devices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
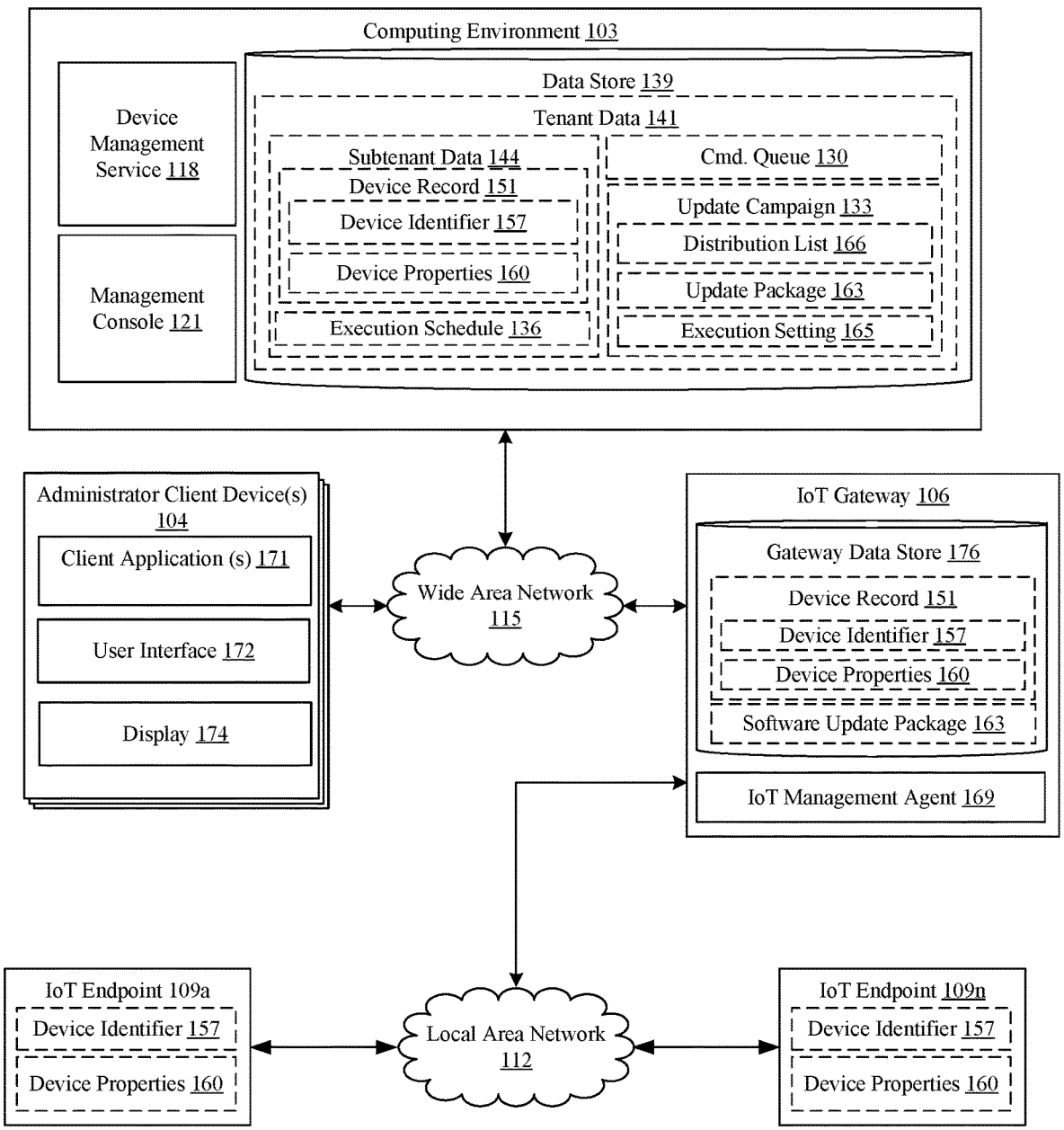
FIG. 1 is a drawing illustrating an example arrangement of a network environment according to various embodiments of the present disclosure.

Disclosed are various approaches for managing the distribution of software update packages to a network connected devices, such as Internet of Things (IoT) devices. Various applications or operating systems can be installed on IoT devices. As new versions of these applications or device firmware become available, an administrator might be tasked with updating a large number of IoT devices with updated firmware and applications. However, in order to cause the new versions of the applications or device firmware to be installed on the managed IoT devices, an update campaign update must be created by an update server and executed by managed devices in response to commands received from the update server. An update campaign can include software update packages that are to be executed by a defined list of devices. For example, the update campaign can correspond software update packages for a subset of registered devices that meet a defined criteria (e.g., all devices with device template X having a name that includes "DEV").

The present disclosure relates to separating the distribution and execution of update campaigns in order to control the amount of active updates that can occur during a given time on devices that are associated with tenants (e.g., organizations) and subtenants (e.g., sub-organizations) in a multi-tenant environment. In a multi-tenant environment, organizations in a hierarchical structure may have the need to operate on a similar set of resources, such as, device templates, devices, software update packages, update campaigns, and/or other resources. However, by trying to maintain control of and permissions provided to sub-organizations, this can yield to problems such as, for example, the need to re-create similar operations repeatedly for all sub-organizations. By separating a creation of an update campaign, from the execution runtime, the embodiments of the present disclosure reduce the manual work needed (e.g., recreating similar update campaigns for all sub-organizations in a hierarchical structure) and reduce the complexity of handling different sub-organizations.

According to various examples, a root administrator can have permissions that allow the administrator to define an update campaign for devices that are included in a root organization and any sub-organizations (e.g., children) of a root organization. As such, consistency is maintained by having the root administrator define the same software policies to be enforced across all industries and sub-organizations in the root organization. However, as different sub-organizations can differ from one other based on location, time zones, maintenance periods, approval criteria, etc., the execution of the defined update campaigns can be controlled by the individual sub-organizations. This allows the sub-organization administrator to define the appropriate time for an update based on various factors including, location, time zone, maintenance periods, approval criteria, and/or other factors. As such, according to various examples and based on assigned permissions, a sub-organization administrator can be provided a read-only view of the update campaign configuration defined by the root administrator and can approve the execution of and/or define an execution schedule defining when devices in the sub-organization that are subject to the update campaign can execute the update campaign.

As illustrated in FIG. 1, shown is a networked environment 100 according to various embodiments. The networked environment 100 includes a computing environment 103, an administrator client device 104, an internet of things (IoT)

gateway 106, and a number of IoT endpoints 109a-n. The computing environment 103, the administrator client device 104, the IoT gateway 106, and the IoT endpoints 109a-n can be in data communication with each other. For example, multiple IoT endpoints 109a-n can be in data communication with each other or with an IoT gateway 106 over a local area network (LAN) 112. The IoT gateway 106 and the administrator client device 104 can in turn be in data communication with the computing environment 103 over a wide area network (WAN) 115.

The LAN 112 represents a computer network that interconnects computers within a limited area or a limited logical grouping. For example, the LAN 112 could include a wired or wireless network that connects computing devices within a building (such as a residence, office, school, laboratory, or similar building), collection of buildings (such as, a campus, an office or industrial park, or similar locale etc.), a vehicle (such as an automobile, an airplane, train, a boat or ship, or other vehicle), an organization (such as devices with network connectivity owned or leased by an organization), a sub-organization of the organization, or other limited area or limited grouping of devices.

The WAN 115 represents a computer network that interconnects computers that are members of separate LANS 112. Accordingly, the WAN 115 can correspond to a network of networks, such as the Internet.

The LAN 112 and the WAN 115 can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless WI-FI® networks, BLUETOOTH® networks, microwave transmission networks, as well as other networks relying on radio broadcasts. The LAN 112 or the WAN 115 can also include a combination of two or more networks.

The computing environment 103 can include, for example, a server computer or any other system providing computing capability. Alternatively, the computing environment 103 can employ a plurality of computing devices that can be arranged, for example, in one or more server banks, computer banks, or other arrangements. Such computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103 according to various embodiments. The components executed on the computing environment 103, for example, can include a device management service 118, a management console 121, and other applications, services, processes, systems, engines, or functionality not discussed in detail herein.

The device management service 118 can oversee the operation of IoT gateways 106 and IoT endpoints 109 enrolled with the device management service 118. The device management service 118 can further cause device records 127 to be created, modified, or deleted (such as in response to enrollment or unenrollment or registration of an IoT endpoint 109). Commands issued by the device management service 118 for IoT endpoints 109 or IoT gateways 106, such as to apply settings or perform specific actions can be stored in the command queue 130 by the device management service 118. As discussed later, the IoT gateway 106 can retrieve and execute any commands stored in the command queue 130. The device management service 118 can further create update campaigns 133 on administrator parameters and initiate the software update process on the qualifying devices by storing commands in the command queue 130 according to the execution schedule 136.

According to various embodiments, the device management service 118 can control the amount of active updates occurring for an update campaign 133 based on the execution schedule 136 defined by the administrator, or other authorized user, of a sub-organization. The execution schedule 136 can define a time and/or date in which the update campaign 133 can be executed by the devices in the particular sub-organization. It should be noted that although the device management service 118 is discussed herein as being able to initiate execution of the update campaign 133 for different devices in a sub-organization based on the execution schedule 136 for the given sub-organization, other applications can be configured to provide such functionality, as can be appreciated.

The management console 121 can provide an administrative interface for configuring the operation of individual components in the networked environment 100. For example, the management console 121 can provide an administrative interface for the device management service 118. The management console 121 can also provide an interface for the configuration of update campaigns 133 containing software update packages that are applicable to IoT endpoints 109. The management console 121 can further provide an interface for the configuration the update campaigns 133 by an administrator of the root organization and execution schedules 136 by the administrator of the sub-organizations. Accordingly, the management console 121 can correspond to a web page or a web application provided by a web server hosted in the computing environment 103.

Also, various data is stored in a data store 139 that is accessible to the computing environment 103. The data store 139 can be representative of a plurality of data stores 139, which can include relational databases, object-oriented databases, hierarchical databases, hash tables or similar key-value data stores, as well as other data storage applications or data structures. The data stored in the data store 139 is associated with the operation of the various applications or functional entities described below. This data can include tenant data 141, and potentially other data.

The tenant data 141 can include data associated with the different tenants (e.g., root organizations) that employ the services of the device management service 118. For example, an instance of the device management service 118 can service multiple different organizations, or customers, and sub-organizations by providing shared access to the device management service 118 while maintaining isolation among the different tenants and/or subtenants. The tenant data 141 can include subtenant data 144, update campaign(s) 133, a command queue 130, and potentially other data.

The subtenant data 144 can include data associated with different organizations or sub-organizations of a tenant registered with the device management service 118. For example, the subtenant data 144 can include a device record 151, execution schedule 136, and potentially other data.

A device record 151 can represent an IoT endpoint 109 enrolled with and managed by the device management service 118. Accordingly, a device record 151 can be created by the device management service 118 in response to enrollment of a respective IoT endpoint 109. Therefore, each device record 151 can include a device identifier 157, one or more device properties 160, and potentially other data associated with an enrolled IoT endpoint 109.

A device identifier 157 can represent data that uniquely identifies an IoT endpoint 109 with respect to another IoT endpoint 109 and, therefore, allow one to uniquely identify one device record 151 with respect to another device record 151. Examples of device identifiers 157 include media access control (MAC) addresses of network interfaces of individual IoT endpoints 109, globally unique identifiers (GUIDs) or universally unique identifiers (UUIDs) assigned to enrolled IoT endpoints 109, international mobile equipment identifier (IMEI) numbers assigned to cellular modems of IoT endpoints 109, and tuples that uniquely identify an IoT endpoint 109 (such as a combination of a manufacturer name and serial number). However, other information can also be used as a device identifier 157 in various implementations.

A device property 160 can represent information related to or regarding an IoT endpoint 109. In some instances, a device property 160 can reflect the status of an IoT endpoint 109 or a component of an IoT endpoint 109. Examples of device properties 160 can include information about the IoT endpoint 109 itself, such as the manufacturer, model name and model number, model revision of the IoT endpoint 109. Similarly, device properties 160 can include information such as identifiers of software packages 163 installed on the IoT endpoint 109, version information for software packages 163 installed on the IoT endpoint 109, and potentially other information. In some examples, device properties 160 can include data that identifies the sub-organizations of the enterprise organization that is associated with the IoT endpoint 109.

The execution schedule 136 can include settings defining a period of time when an update campaign 133 can be executed by devices belonging to a particular sub-organization. The execution schedule 136 is defined by the administrator of the sub-organization. If there are update campaigns 133 that have been assigned to devices in the sub-organization, the execution setting 165 associated with the update campaign 133 can be enabled, thereby allowing the update campaign 133 to be pushed down to or sent to the command queue of corresponding IoT gateway 106. In some examples, the execution schedule 136 is predefined by an administrator of the sub-organization in order to regulate the amount of devices being updated during a given time. By regulating the update resources during an update campaign for a given sub-organization, the amount of active updates occurring can be controlled and the overall system can be improved by minimizing update failures, download speeds, and/or other issues that can result in response to an overactive update campaign. In addition, due to various factors such as, location, time zone, maintenance periods, approval criteria, and/or other factors, the optimal time for an update may differ among the different sub-organizations. As such, the sub-organization administrator is provided permissions that allow the sub-organization administrator to determine when the update campaign 133 can be executed by devices in the sub-organization.

An update campaign 133 can represent one or more software update packages 163 that are to be assigned to an identified set of IoT endpoints 109. Accordingly, the update campaign 133 can include a distribution list 166 that includes device identifiers 157 identifying device records 151 for IoT endpoints 109 subject to the update campaign 133, a software update package 163, an execution setting 165, and/or other information. Other information can also be stored in an update campaign 133 as desired for individual implementations. In some implementations, the update campaign 133 can also include a software update package identifier that identifies the software update package 163 associated with the campaign.

The distribution list 166 identifies the registered devices that are subject to the update campaign 133. The registered devices that are a subject to the update campaign 133 can include registered devices that include characteristics that match a predefined criteria. For example, the criteria can be defined by an administrator requesting creation of the update campaign 147, and can include device template (e.g., type of device, how the device was registered, etc.), a name included in the device name, an organization associated with the device, or other criteria that can be used to identify a device for a given update campaign 133.

A software update package 163 can be created with a package tool and bundles a software executable for installation on an IoT endpoint 109, a manifest file that specifies what is contained within the software update package 163, and one or more lifecycle scripts. In one implementation, each lifecycle phase can have a corresponding script that can be executed on the IoT endpoint 109 to perform the tasks associated with the phase. The software executable can comprise an installer or a firmware image that can be installed onto IoT endpoints 109 associated with the update campaign 133.

In some instances, the software update package 163 can include an executable program that, when executed by an IoT endpoint 109, installs or updates a respective application on the IoT endpoint 109. In other instances, the installer represents a package of files that, when unpacked by an application executing on the IoT endpoint 109, results in the installation of the respective application. Examples of software packages include MICROSOFT WINDOWS® MSI and PPKG files, REDHAT® Package Manager (RPM) files, DEBIAN® installer files, ANDROID® Package (APK) files, and similar package formats for applications of device firmware. A software update package 163 can include various metadata, such as a version identifier. The version identifier can indicate the version of the software update package 163 in order to differentiate between older and more recent versions of the software update package 163.

A command queue 130 can represent a queue of commands sent from a device management service 118 to an IoT management agent 169. When the device management service 118 sends a command or instruction, such as a command to apply a software update specified in an update campaign 133 to an IoT endpoint 109, the command can be stored in the command queue 130 until the IoT management agent 169 retrieves the command from the command queue 130. In some instances, a dedicated command queue 130 can be created for each instance of an IoT management agent 169. In other instances, however, a single command queue 130 can be used to store commands intended for multiple IoT management agents 169. An IoT endpoint 109, update campaign 133, or IoT gateway 106 can be associated with their own respective command queue 130.

The administrator client device 104 can be representative of one or more client devices 104. For purposes of convenience, the administrator client device 104 is often referred to herein in the singular. The administrator client device 104 can include a processor-based system, such as a computer system, that can include a desktop computer, a laptop computer, a personal digital assistant, a cellular telephone, a smartphone, a set-top box, a music player, a tablet computer system, a game console, an electronic book reader, a smartwatch, or any other device with like capability. The administrator client device 104 can also be equipped with networking capability or networking interfaces, including a localized networking or communication capability, such as a near-field communication (NFC) capability, radio-frequency identification (RFID) read or write capability, or other localized communication capability. In some embodiments, the administrator client device 104 is mobile where the administrator device 104 is easily portable from one location to another.

The administrator client device 104 can execute applications including a client application 171 and other applications. The client application 171 can include a browser, a device settings interface, or other applications. Further, other client applications 171 can include device management applications, enterprise applications, social networking applications, word processors, spreadsheet applications, media player applications, or other applications. In some cases, the applications can access network content served up by the device management service 118, management console 121, or other servers.

The administrator client device 104 can include a display 174 upon which a user interface 172 is generated by the client application 171 or another application can be rendered. The display 174 can be a liquid crystal display (LCD), organic light emitting diode (OLED), touch-screen display, or other type of display device. The administrator client device 104 can also include one or more input/output devices that can include, for example, a capacitive touchscreen or other type of touch input device, fingerprint reader, or keyboard.

The IoT gateway 106 represents a computing device that acts as a proxy or relay between IoT endpoints 109a-n and the device management service 118. For example, an IoT gateway 106 can represent a network access point or interface between the local area network 112 and the wide area network 115. In other instances, the IoT gateway 106 can be a dedicated device attached to the LAN 112 that communicates across the WAN 115 with the device management service 118 on behalf of IoT endpoints 109 attached to the LAN 112.

An IoT management agent 169 can be executed by the IoT gateway 106 to perform various functions on behalf of the IoT endpoints 109a-n. For example, the IoT management agent 169 can register or enroll IoT endpoints 109a-n with the device management service 118. As another example, the IoT management agent 169 can download, process, and enforce one or more applicable compliance policies. For instance, the IoT management agent 169 can retrieve a command from the command queue 130. The command can instruct the IoT management agent 169 to obtain a software update package 163 for a particular device campaign 147 and roll an update to IoT endpoints 109. Accordingly, the IoT management agent 169 could then download the specified version of the software update package 163 for installation on IoT endpoints 109.

The gateway data store 176 can be representative of a plurality of gateway data stores 176, which can include relational databases, object-oriented databases, hierarchical databases, hash tables or similar key-value data stores, as well as other data storage applications or data structures. The data stored in the gateway data store 176 is associated with the operation of the various applications or functional entities described below. This data can include one or more device records 151 of respective IoT endpoints 109a-n, any applicable compliance policies, and software update packages 163 obtained from the device management service 118 for rollout to IoT endpoints 109.

An IoT endpoint 109 is representative of any internet connected embedded device, appliance, sensor, or similar smart device. Examples of IoT endpoints 109 can include network connected home appliances (such as locks, refrigerators, thermostats, sprinkler controllers, smoke detectors, garage door openers, light-switches, fans, lights, security cameras, or similar devices), vehicular electronics (such as on-board diagnostic computers, entertainment systems, access controls, or similar devices), and other similar network connected devices. IoT endpoints 109 are often distinguishable from other client devices (such as personal computers or mobile devices) by their lack of functionality. For example, IoT endpoints 109 often do not provide general purpose computing abilities, lack an operating system that allows for a remote management service to gain direct administrative control over the IoT endpoint 109, and/or IoT endpoints 109 are not configured or configurable to execute an IoT management agent 169.

Often, an IoT endpoint 109 can also store a device identifier 157 that uniquely identifies the IoT endpoint 109 and one or more device properties 160. In some instances, one or more of these values can be set by the manufacturer. In other instances, one or more of these values can be set or specified by the device management service 118. An IoT endpoint 109 can run a particular operating system or shell environment that permits the execution of lifecycle scripts that correspond to the different lifecycle phases. The IoT endpoint 109 can also include a filesystem in which files obtained the IoT Gateway 106 can be stored.

Next, a general description of the operation of the various components of the networked environment 100 is provided. To begin, a root organization that owns or otherwise includes multiple sub-organizations may wish to enforce common software policies across all of their industry units. For example, the software polices may include updating particular devices in the root organization with selected software packages 163. The root administrator associated with the root organization can define or otherwise create the update campaign 133 by interacting with a management console 121 through user interfaces 172 displayed on an administrator client device 104. For example, the root administrator can select the different update packages 163 that are to be applied to the different devices in the update campaign. In addition, the root administrator can define the devices that are to be subject to the software policies by defining device criteria that can be used to identify different devices in the root organization and sub-organizations. For example, the criteria can include a device template (e.g., type of device, how the device was registered, etc.), a name included in the device name, an organization associated with the device, or other criteria that can be used to identify a device for a given update campaign 133.

Upon receiving the selection of update packages 163 and the criteria for identifying the devices that are to be subject to the update campaign 133, the device management service 118 can upload the corresponding update packages 163. In addition, the device management service 118 can create a distribution list 166 that includes a list of the devices in the root organization that are to be subject to the update campaign 133. For example, the device management service 118 can create a distribution select query, or similar type of SQL query, using the criteria defined by the root administrator. The distribution select query can search a registered device database and return search results identifying the devices in the root organization that match the criteria and are subject to the update campaign 133. The devices can include devices that are included in different sub-organizations of the root organization.

The device management service 118 can create the update campaign 133 using the uploaded update packages 163 and the distribution list 166. This update campaign 133 can be applicable to all qualifying devices across multiple sub-organizations of the root organization. As such, individual update campaigns 133 are not required to be re-created separately by the different sub-organizations. In various examples, the device management service 118 can disable the execution setting 165 for the update campaign 133 such that control of the execution of the update campaign 133 is given to the administrators of each of the associated sub-organizations. For example, there may be a million devices across the different devices that may be subject to the update campaign 133. However, due to the geolocation, time zones, maintenance periods, approval criteria, and/or other factors for each industry and/or sub organization, there may be a desire to have the execution of the campaign started or otherwise controlled by the sub-organization administrator.

In various embodiments, a sub-organization administrator, or other authorized user of the sub-organization, can interact with the management console 121 via user interfaces 172 rendered by an administrator client device 104. The sub-organization administrator can be presented various information associated with the devices included in the sub-organization, including whether there are any update campaigns 133 to be started or otherwise approved. However, according to various examples, the permissions provided to the sub-organization administrator only allows the administrator to view a read-only view of the update campaign configuration. As such, the sub-organization administrator is not permitted to modify the settings defined by the root administrator. However, the sub-organization administrator is permitted to approve the execution of the update campaign 133 and/or determine an execution schedule 136 for executing the update campaign that is specific to only the devices in the sub-organization that are subject to the update campaign 133. For example, the sub-organization administrator can define the execution schedule 136 by providing a date and/or time in which the update campaign 133 can be executed by the qualifying devices in the sub-organization.

Upon approval by the sub-organization administrator and/or a determination that the current time is within the timeframe defined by the execution schedule 136, the device management service 118 can enable the execution setting 165 in the update campaigns 133 for the devices in the corresponding sub-organization. Upon enabling the execution setting 165, the device management service 118 can initiate the execution of the update campaigns 133 for the devices in the given sub-organization. For example, the device management service 118 can send a command or instruction, such as a command to apply a software update specified in an update campaign 133 to an IoT gateway 106 and/or an IoT endpoint 109 included in the sub-organization. In some examples, the command can be stored in the command queue 130 until the IoT management agent 169 of an IoT gateway 106 that is part of the sub-organization retrieves the command from the command queue 130. In other examples, the device management service 118 can push the command to apply a software update specified in the update campaign 133 to IoT management agent 169 of the IoT gateway 106 in the sub-organization.

In various examples, limitations can be imposed with respect to starting, approving, or scheduling an update campaign. In some examples, an update campaign cannot be started, approved, or scheduled in any sub-organization if any of those actions has been performed in a parent organization. This can allow the parent organization to enforce policies for important securing updates, for example. In another example, when a new device is registered in the hierarchy, the root level may want to ensure that the new devices process a specific set of configuration and software updates. Such a campaign can be started on the root level and the distribution list may include devices from both the root organization and sub-organizations.

It should be noted that, in some examples, the device management service 118 can enable the execution setting 165 upon creation and the devices subject to the update campaign 133 can immediately begin executing the update campaign 133. For example, as discussed above, there are some situations in which the update campaign 133 where the root administrator may wish to update devices immediately upon creation of the update campaign 133 without the approval or execution schedule of the sub-organization. As such, in some examples, the root administrator may request that the execution setting 165 be enabled upon creation, thereby causing the update campaign 133 to begin on all devices (e.g., root and sub-organizations) subject to the update campaign 133.

Figure 2:
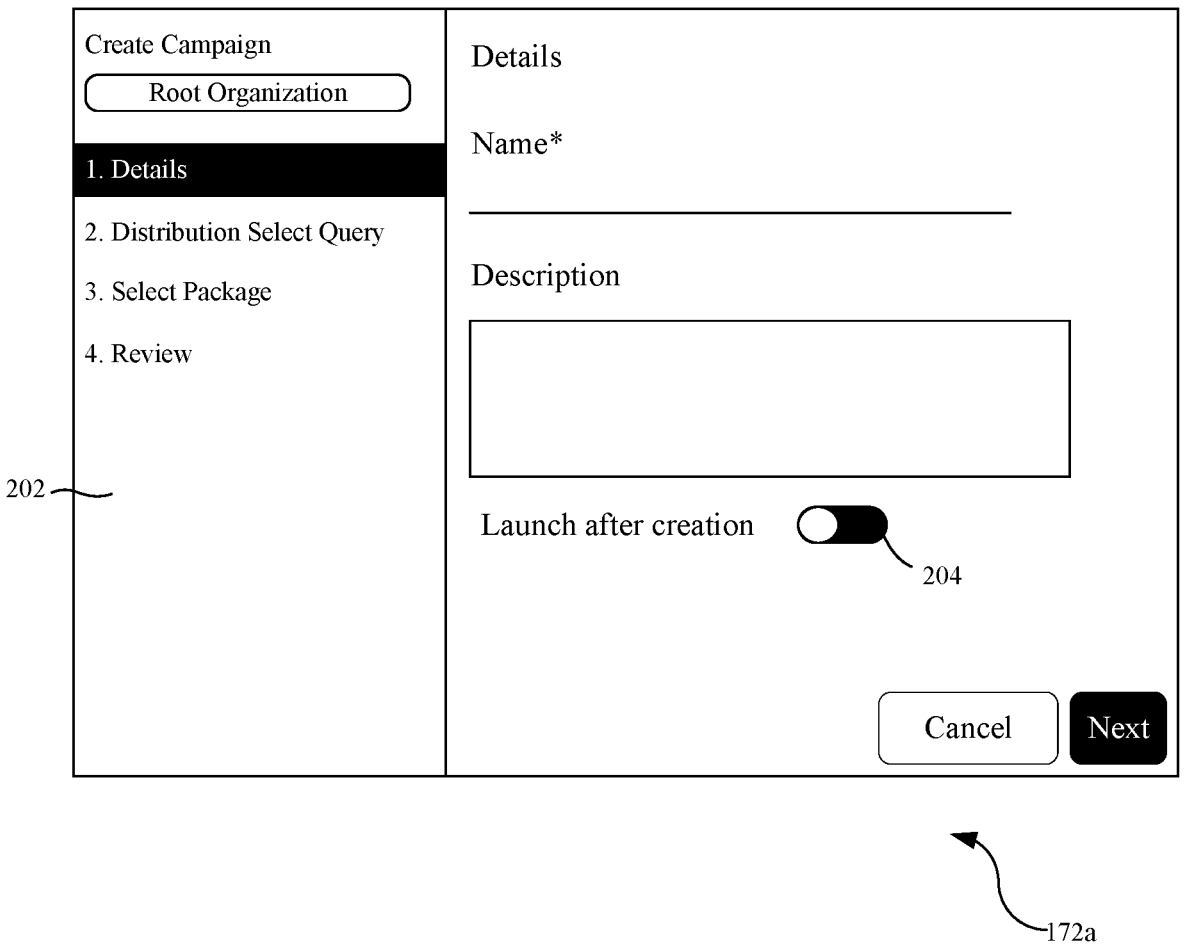
FIGS. 2 and 3A-3B are drawings of example user interfaces rendered by an administrator client device in the network environment of FIG. 1.

Moving on to FIG. 2, shown is an example user interface 172a rendered by the administrator client device 104 according to various embodiments of the present disclosure. In particular, FIG. 2 illustrates an example of a user interface 172a that a root administrator of a root organization may encounter when interacting with the management console 121 to set the parameters for creating an update campaign 133. For example, the root administrator can select on the different components in the left panel 202 to define the details (e.g., name, description) of the update campaign, define the criteria used in a distribution select query to identify the devices that will be subject to the update campaign, and select the update packages 163 that are to be enforced on the subject devices. FIG. 2 further illustrates a toggle component 204 that the root administrator can use to disable the execution setting 165.

Figures 3A, 3B:

Turning now to FIG. 3A, shown is an example user interface 172b that can be presented to a sub-organization administrator upon a request to review an update campaign configuration for devices included in the sub-organization that are subject to the update campaign 133. In particular, the user interface 172b includes a read-only view of the update campaign configuration defined by the root administrator. As shown in FIG. 3A, the sub-organization administrator can review parameters associated with an update campaign 133 such as, for example, a campaign name, a campaign identifier, the criteria associated with the devices that are subject, a date/time when the campaign was created, and the software update packages 163 included in the update campaign. The sub-organization administrator is unable to modify any of the configurations associated with the update campaign 133 as defined by the root administrator. However, as shown in FIG. 3A, the sub-organization administrator can start, stop, approve, edit, delete, or abort the update campaign 133. As such, while the sub-organization administrator does not have the ability to modify the update campaign 133, the sub-organization administrator has control over the execution of the update campaign 133.

Referring next to FIG. 3B, shown is an example of another user interface 172c that can be presented to a sub-organization administrator upon a request to edit an update campaign 133. In contrast to the user interface 172a or series of the user interfaces 172 that can be presented to the root administrator when defining the update campaign 133, the sub-organization administrator is only allowed to define the execution schedule 136 for when devices in the sub-organization that are subject to the update campaign 133 can execute the update campaign 133. In particular, the sub-organization administrator can interact with the user interface 172c of FIG. 3B to define the date and time for allowing execution of the update campaign 133 by devices in the sub-organization that are subject to the update campaign 133.

Figure 4:
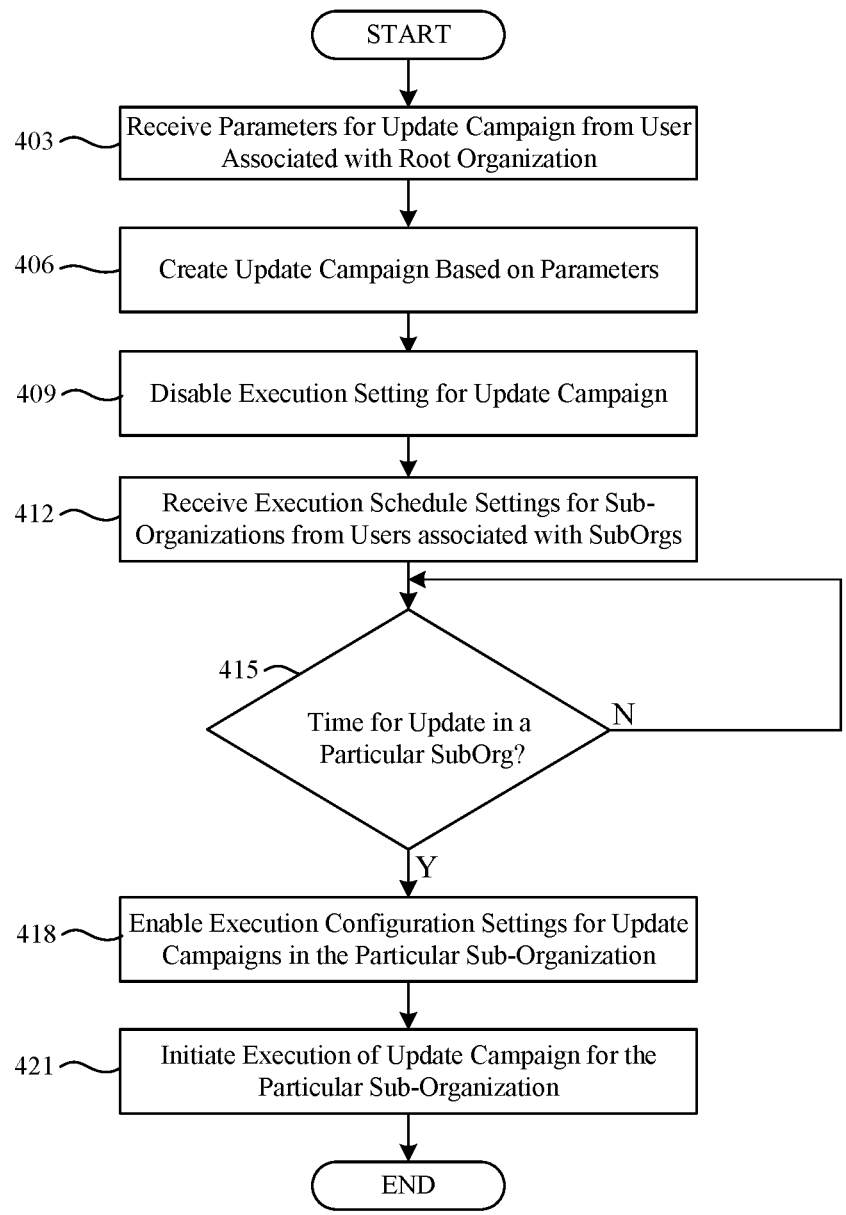
FIGS. 4-5 are flowcharts depicting examples of the operation of components of the network environment of FIG. 1.

Referring next to FIG. 4, shown is a flowchart that provides one example of the operation of the device management service 118 and management console 121. FIG. 4 provides merely an example of the many different types of functional arrangements that can be employed to implement the operation of the device management service 118 and management console 121. As an alternative, the flowchart of FIG. 4 can be viewed as depicting an example of elements of a method implemented in the computing environment 103. FIG. 4 illustrates how the device management service 118 creates and executes an update campaign 133 according to the parameters defined by both the root administrator of the root organization and the sub-organization administrator of a given sub-organization of the root organization.

Beginning at step 403, the device management service 118 via interactions with the management console 121 receives user inputs defining parameters for an update campaign 133 from a user associated with the root organization. For example, the user can include an administrator with permissions to set settings and manage all the devices included in the root organization. In particular, the device management service 118 can receive inputs from the user defining the software update packages 163 that are to be part of the update campaign 133. The software update package 163 can be created with a package tool and bundles a software executable for installation on an IoT endpoint 109, a manifest file that specifies what is contained within the software update package 163, and one or more lifecycle scripts. In one implementation, each lifecycle phase can have a corresponding script that can be executed on the IoT endpoint 109 to perform the tasks associated with the phase. The software executable can comprise an installer or a firmware image that can be installed onto IoT endpoints 109 associated with the update campaign 147.

In addition, the device management service 118 can receive inputs from the user defining criteria that is used to identify which registered devices are to be included in the update campaign. For example, the criteria can include a device template type (e.g., device properties), a name included in the device name, an organization associated with the device, or other criteria that can be used to identify a device for a given update campaign 147.

At step 406, the device management service 118 creates an update campaign 133 based on the parameters defined by the root administrator. In particular, the device management service 118 can upload the update package 163 that is to be delivered to the registered devices subject to the update campaign 133. In addition, the device management service 118 can generate the distribution list 166 identifying the qualifying devices can be based on the identification of the devices that match the criteria. In some examples, the distribution list 166 is generated upon search of the data store 139, or other database of registered devices to identifying qualifying devices based on the criteria. For example, the search can include structured query language (SQL) query returns a list of all registered devices that match the defined criteria. Once the distribution list 166 is generated and the software update packages 163 are uploaded, the device management service 118 creates the update campaign 133.

At step 409, the device management service 118 disables the execution setting 165 associated with the update campaign 133. In particular, the execution setting 165 can be used to define whether the execution of the update campaign 133 is to occur. To allow for the separation of the creation of and execution of the update campaign 133, the execution setting 165 can be initially disabled upon creation of the update campaign 133. Accordingly, creating the update campaign 133 with the execution setting 165 disabled yields control to the sub-organization administrator for defining when the execution setting 165 can be enabled for update campaigns 133 based on a defined execution schedule 136.

At step 412, the device management service 118 receives execution schedule settings for sub-organizations from users associated with the different sub-organization of the root organization. In particular, as discussed with respect to FIG. 5, the sub-organization administrators can interact with the management console 121 via one or more user interfaces 172 rendered on administrator client devices 104. The sub-organization administrators can be provided a read-only view of the update campaign configuration to review. Although the sub-organization administrator cannot modify the settings defined by the root administrator, the sub-organization administrators can define the execution schedule 136 that is appropriate for the particular sub-organization. For example, sub-organization specific factors such as geolocation, time zone, maintenance schedule, etc. can affect the appropriate time to initiate the execution of an update campaign 133. As such, the sub-organization administrator, or other authorized user, can define the execution schedule 136 for the execution of the update campaign via interactions with the management console 121. In particular, the sub-organization administrator can define a date and/or time for starting the execution of the update campaign 133 by devices in the sub-organization that are subject to the update campaign 133. In some examples, the sub-organization administrator can also approve the update campaign 133.

At step 415, the device management service 118 determines if it is time to initiate an execution of an update campaign 133 for any of the devices included a given sub-organization based on the defined execution schedules 136 for the sub-organizations. For example, if the current time is within the timeframe defined by an execution schedule 136 for any one of the sub-organizations, the device management service 118 proceeds to step 418. Otherwise, the device management service 118 remains at step 415.

At step 418, the device management service 118 enables the execution setting 165 for the update campaign 133 for devices included in the particular sub-organization. In particular, if there is an update campaign 133 created that includes devices in the distribution list 166 that are part of the sub-organization, the device management service 118 will enable the execution setting 165 for only those devices to indicate that that the devices can begin execution of the assigned update campaign 133. If there are devices in the distribution list 166 that belong in another sub-organization that defines a different execution schedule 136 that is not currently active, the execution setting 165 for those devices will remain disabled.

At step 421, the device management service 118 will initiate the execution of update campaigns 133 for devices included in the particular sub-organization. For example, the device management service 118 can send a command or instruction, such as a command to apply a software update specified in an update campaign 133 to an Iot gateway 106 and/or an IoT endpoint 109 included in the sub-organization. In some examples, the command can be stored in the command queue 130 until the IoT management agent 169 of an IoT gateway 106 that is part of the sub-organization retrieves the command from the command queue 130. In other examples, the device management service 118 can push the command to apply a software update specified in the update campaign 133 to IoT management agent 169 of the IoT gateway 106 in the sub-organization. Thereafter, the process shown in FIG. 2 proceeds to completion.

Figure 5:
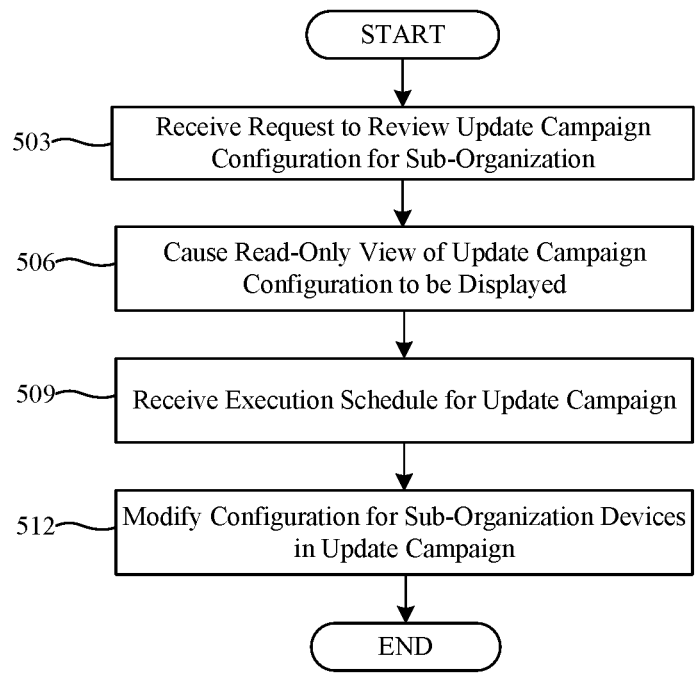

Referring next to FIG. 5, shown is a flowchart that provides one example of the operation of the device management service 118 and management console 121. FIG. 5 provides merely an example of the many different types of functional arrangements that can be employed to implement the operation of the device management service 118 and the management console 121. As an alternative, the flowchart of FIG. 5 can be viewed as depicting an example of elements of a method implemented in the computing environment 103. FIG. 5 illustrates how an administrator of a particular sub-organization can interact with the device management service 118 via the management console 121 to define the execution schedule 136 of created update campaigns 133 for devices included in a sub-organization of a root organization.

At step 503, the management console 121 receives a request to review update campaign configuration for a sub-organization. For example, a sub-organization administrator may request to review status updates for devices in the sub-organization via interactions with the management console 121. If there are devices within the sub-organization that are subject to an update campaign 133 created by a root administrator, the user interface 172 presented to the sub-organization administrator may indicate that there is an update campaign 133. The request may correspond to a selection of the update campaign 133 via interactions with the user interface 172 presented to the sub-organization administrator.

At step 506, the management console 121 causes a read-only view of the update campaign configuration to be displayed via a user interface 172 rendered by the administrator client device 104. In particular, the update campaign configuration can include the various parameters defined by the root administrator when creating the update campaign 133. For example, the read-only view can include the campaign name, the distribution list 166, a summary of the software update packages 163, and/or other information. However, the update campaign configurations are provided in a read-only view so that the sub-organization administrator is unable to modify the distribution list 166 or software update packages 163. However, according to various examples, the sub-organization administrator is provided the ability to control the execution of the update campaign 133 for the devices included in the sub-organization.

At step 509, the management console 121 receives an execution schedule 136 for execution the devices in the sub-organization. In particular, the sub-organization administrator can interact with the user interfaces 172 provided by the management console 121 to define the date and/or time in which the devices in the sub-organization that are subject to the update campaign 133 are permitted to execute the update campaign 133. In some examples, the sub-organization administrator can also approve or disapprove the execution of the update campaign 133 in the devices included in the sub-organization.

At step 512, the device management service 118 can modify the update campaign configuration associated with the update campaign 133 for the devices in the sub-organization that are subject to the update campaign. For example, the device management service 118 can enable the execution setting 165 for the update campaigns 133 for the devices in the sub-organization when the current time corresponds to the execution schedule 136. In some examples, approval of the update campaign 133 by the sub-organization administrator can cause the device management service 118 to enable the execution setting 165. Thereafter, the process shown in FIG. 5 ends.

Although the device management service 118, the management console 121, the client application 171, the IoT management agent 169, and other various systems described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show examples of the functionality and operation of various implementations of portions of components described in this application. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

What is claimed is:

1. A system for managing software updates to be applied to a plurality of IoT devices managed by a device management system through a management agent installed in a gateway device that relays instructions for applying the software updates from the device management system to the IoT devices, wherein the software updates are specified in a software update campaign defined by an administrator of a root organization, comprising:
   at least one computing device of an administrator of a sub-organization of the root organization; and
   at least one application executable on the at least one computing device, wherein, when executed, the at least one application causes the at least one computing device to at least:
   retrieve the software update campaign for the plurality of IoT devices defined by the administrator of the root organization;
   generate and display a user interface including a read-only view of a configuration of the software update campaign and input elements for approving and creating an execution schedule for the software update campaign for a subset of the IoT devices associated with the sub-organization;
   receive approval of the software update campaign for the subset of the IoT devices and the execution schedule for the software update campaign for the subset of the IoT devices in response to interactions with the input elements of the user interface by the administrator of the sub-organization; and
   transmit to the device management system the approval of and the execution schedule for the software update campaign for subset of the IoT devices,
   wherein the device management system instructs the management agent in the gateway device for the subset of the IoT devices to execute the software update campaign on the subset of the IoT devices according to the execution schedule for the subset of the IoT devices.

2. The system of claim 1, wherein the subset of IoT devices included the sub-organization during a timeframe defined by the execution schedule.

3. The system of claim 2, wherein the device management systems initiates the execution of the software update campaign by writing the software update campaign to a command queue associated with the subset of IoT devices included in the sub-organization.

4. The system of claim 1, wherein, when executed, the at least one application further causes the at least one computing device to at least: enable an execution setting of the software update campaign for the subset of IoT devices included in the sub-organization.

5. The system of claim 1, wherein the execution schedule defines at least a date and a time for starting the software update campaign for the subset of IoT devices in the sub-organization based at least in part on at least one of a geolocation, a time zone, or a maintenance schedule.

6. The system of claim 1, wherein the read-only view of the configuration of the software update campaign comprises a plurality of parameters defined by the root administrator, the plurality of parameters including at least one of a campaign name, a distribution list, or a summary of software update packages.

7. A method of managing software updates to be applied to a plurality of IoT devices managed by a device management system through a management agent installed in a gateway device that relays instructions for applying the software updates from the device management system to the IoT devices, wherein the software updates are specified in a software update campaign defined by an administrator of a root organization, said method comprising:
   retrieving, via at least one computing device of an administrator of a sub-organization of the root organization, the software update campaign for the plurality of IoT devices defined by the administrator of the root organization;
   generating, via the at least one computing device, and displaying on the at least one computing device, a user interface including a read-only view of a configuration of the software update campaign and input elements for approving and creating an execution schedule for the software update campaign for a subset of the IoT devices associated with the sub-organization;
   receiving, via the at least one computing device, approval of the software update campaign for the subset of the IoT devices and the execution schedule for the software update campaign for the subset of the IoT devices in response to interactions with the input elements of the user interface by the administrator of the sub-organization; and
   transmitting, via the at least one computing device to the device management system, the approval of and the execution schedule for the software update campaign for the subset of the IoT devices,
   wherein the device management system instructs the management agent in the gateway device for the subset of the IoT devices to execute the software update campaign on the subset of the IoT devices according to the execution schedule for the subset of the IoT devices.

8. The method of claim 7, wherein the device management systems initiates an execution of software the update campaign for the subset of IoT devices included the sub-organization during a timeframe defined by the execution schedule.

9. The method of claim 8, wherein the device management systems initiates the execution of the software update campaign by writing the software update campaign to a command queue associated with the subset of IoT devices included in the sub-organization.

10. The method of claim 7, further comprising enabling an execution setting of the software update campaign for the subset of IoT devices included in the sub-organization.

11. The method of claim 7, wherein the execution schedule defines at least a date and a time for starting the software update campaign for the subset of IoT devices in the sub-organization based at least in part on at least one of a geolocation, a time zone, or a maintenance schedule.

12. The method of claim 7, wherein the read-only view of the configuration of the software update campaign comprises a plurality of parameters defined by the root administrator, the plurality of parameters including at least one of a campaign name, a distribution list, or a summary of software update packages.

13. A non-transitory, computer-readable medium embodying a program, wherein when executed by a computing device, the program causes the computing device to carry out a method of managing software updates to be applied to a plurality of IoT devices managed by a device management system through a management agent installed in a gateway device that relays instructions for applying the software updates from the device management system to the IoT devices, wherein the software updates are specified in a software update campaign defined by an administrator of a root organization, and the computing device is that of an administrator of a sub-organization of the root organization, said method comprising:

retrieving the software update campaign for the plurality of IoT devices defined by the administrator of the root organization;

generating and displaying a user interface including a read-only view of a configuration of the software update campaign and input elements for approving and creating an execution schedule for the software update campaign for a subset of the IoT devices associated with the sub-organization;

receiving approval of the software update campaign for the subset of the IoT devices and the execution schedule for the software update campaign for the subset of the IoT devices in response to interactions with the input elements of the user interface by the administrator of the sub-organization; and transmitting to the device management system, the approval of and the execution schedule for the software update campaign for the subset of the IoT devices, wherein the device management system instructs the management agent in the gateway device for the subset of the IoT devices to execute the software update campaign on the subset of the IoT devices according to the execution schedule for the subset of the IoT devices.

14. The non-transitory, computer-readable medium of claim 13, wherein the device management systems initiates an execution of the software update campaign for the subset of IoT devices included the sub-organization during a timeframe defined by the execution schedule.

15. The non-transitory, computer-readable medium of claim 14, wherein the device management systems initiates the execution of the software update campaign by writing the software update campaign to a command queue associated with the subset of IoT devices included in the sub-organization.

16. The non-transitory, computer-readable medium of claim 13, wherein, when executed, the program causes the computing device to at least: enable an execution setting of the software update campaign for the subset of IoT devices included in the sub-organization.

17. The non-transitory, computer-readable medium of claim 13, wherein the read-only view of the configuration of the software update campaign comprises a plurality of parameters defined by the root administrator, the plurality of parameters including at least one of a campaign name, a distribution list, or a summary of software update packages.

* * * * *